Nov. 17, 1964   R. E. HEIDRICH   3,157,070
IMPACT MACHINE

Filed June 26, 1961   3 Sheets-Sheet 1

INVENTOR.
RICHARD E. HEIDRICH
BY Thomas P. Mahoney
ATTORNEY

Nov. 17, 1964
R. E. HEIDRICH
3,157,070
IMPACT MACHINE
Filed June 26, 1961
3 Sheets-Sheet 2
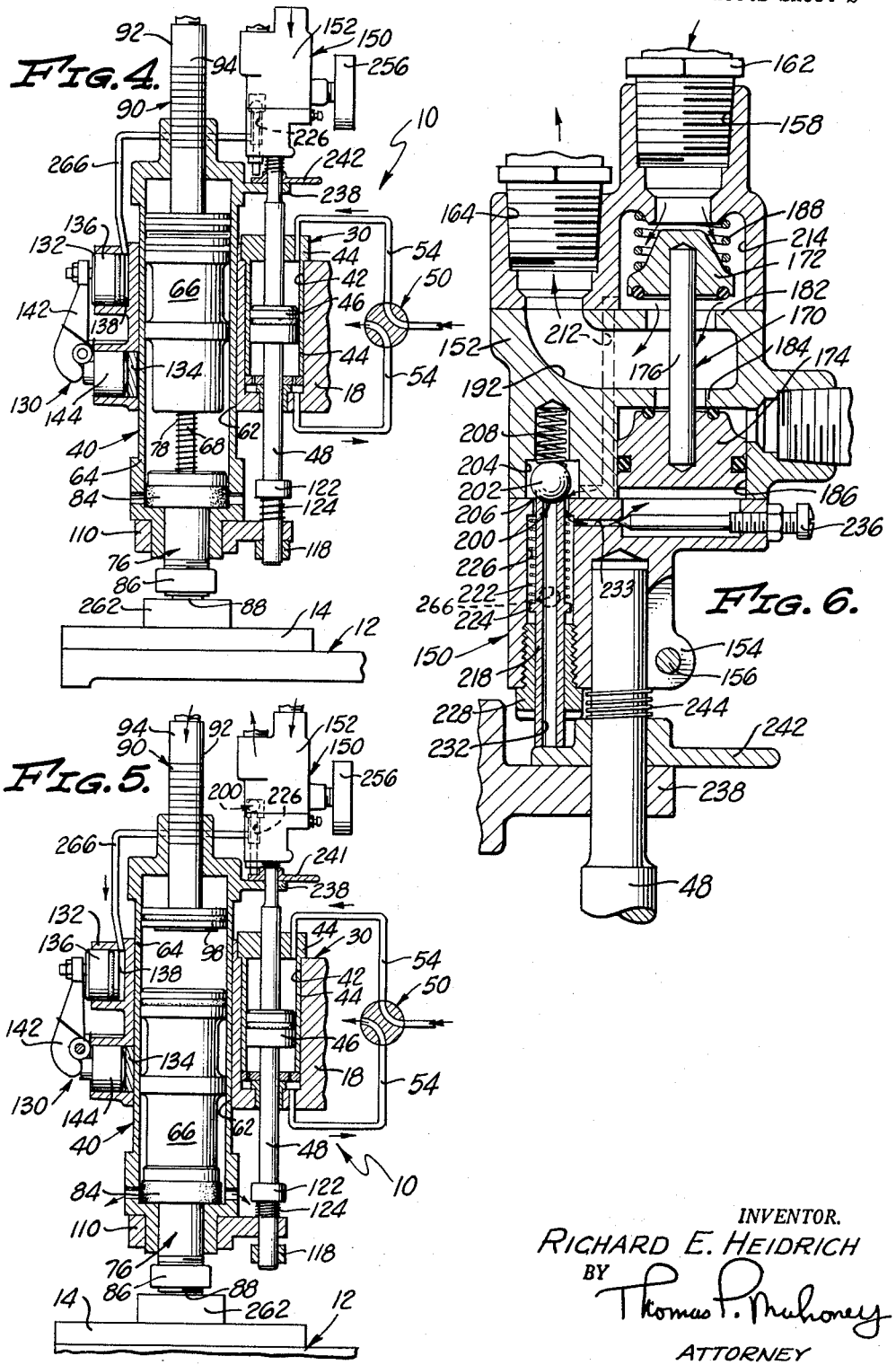
INVENTOR.
RICHARD E. HEIDRICH
BY
Thomas P. Mahoney
ATTORNEY

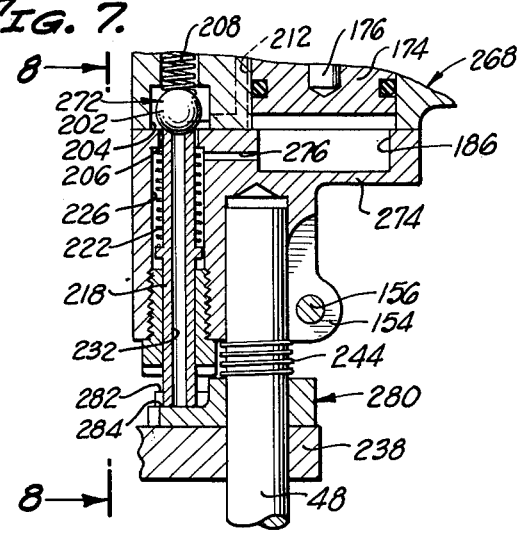
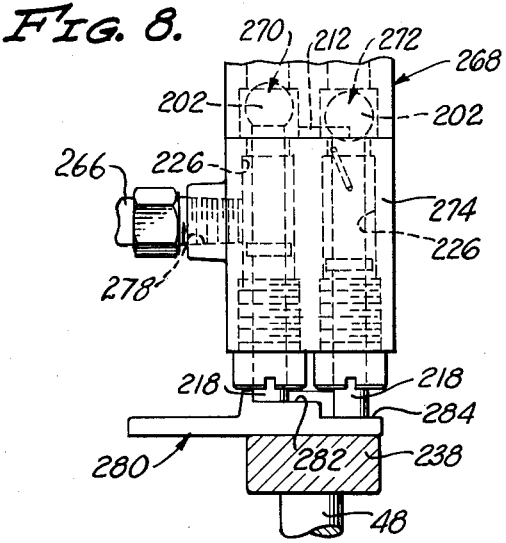

United States Patent Office 3,157,070
Patented Nov. 17, 1964

3,157,070
IMPACT MACHINE
Richard E. Heidrich, 8558 S. Davista Drive, Whittier,
Calif., assignor of one-half to Norman C. Nourse,
Balboa, Calif.
Filed June 26, 1961, Ser. No. 119,527
9 Claims. (Cl. 78—42)

This invention relates to an impact machine and, more particularly, to an impact machine adapted to be utilized in imposing or impressing a hammer-like blow upon a workpiece to stamp, stake, swage, rivet or otherwise handle the workpiece.

The impact machine of the invention is characterized by its versatility of application since it can be adjusted to accommodate a wide variety of different sizes of workpieces and can also be adjusted to alter the stroke of the impact motor incorporated in the machine. Therefore, it is possible to supplant arbor presses and kick presses which are customarily utilized for staking and assembly operations.

Furthermore, the impact machines of the invention are quite versatile in performing a wide variety of operations customarily required of small puch presses such as staking, crimping, flanging, coining, riveting, assembling, impression marking, impact shearing of plastics and the like.

Moreover, the impact machine of the invention can be readily adjusted to determine the force of the impact blow and to determine the work clearance. Since no electric motors or other complex or delicate parts are utilized in the impact machine, it is characterized by prolonged periods of trouble-free operation.

An object of the invention is to provide an impact machine which delivers an impact blow only after the impact tool has been brought into engagement with the workpiece, thereby preventing the delivery of an impact blow from a position spaced above the workpiece.

Another advantage of the impact machine of the invention is that fact that, with parts or workpieces of uniform configuration, it is possible to set the work clearance so accurately that the operator cannot possibly interpose his hand or fingers between the impact tool and the adjacent surface of the workpiece, thus eliminating the necessity for the utilization of expensive and complex safety devices and affording built-in protection for the operator.

Another characteristic of the impact machine of the invention is the incorporation therein of a sequence valve which is adapted to control the sequence of operation of the impact motor in corporated in the impact machine and of an actuating valve which is adapted to lower the impact tool connected to the impact motor downwardly into engagement with the adjacent surface of the workpiece. Therefore, when the actuating valve has been energized the entire impact tool motor is lowered downwardly to bring the impact tool itself into engagement with the workpiece. When the tool is engaged upon the workpiece, the sequence valve is automatically actuated to energize a dampening brake on the impact motor which prevents free movement of the impact motor after the impact blow has been struck. After the brake has been set, the sequence valve operates to feed pressure air to the impact motor to energize the impact piston and operate the impact tool holder and the impact tool mounted therein. Therefore, it is impossible for an operator of the impact machine of the invention to have his hand or fingers caught between the hammer or tool of the impact machine and the workpiece when the hammer blow is struck. This eminently desirable result is achieved because of the fact that the sequence valve is not energized until the impact motor is carried downwardly to engage the impact tool upon the workpiece and the lost motion connection between the impact motor and the sequence valve permits energization of the sequence valve. In another embodiment of the invention, the sequence valve includes a pair of pilot valves to perform the functions of a single pilot valve of the sequence valve just mentioned. One of the pair of pilot valves is actuable to feed air to the dampening brake, the other being subsequently actuable to initiate the feeding of air under pressure to the impact motor to move the impact piston. The interval between actuation of the two pilot valves is positively controlled by sequential engagement of the valves with an adjustable abutment. This is in contrast to the use of a single pilot valve which adjusts the interval between the feeding of air to the dampening brake and the impact motor by means of needle valve regulation which delays the feeding of air to the impact motor in proportion to the rate of air flow past the needle valve.

Other objects and advantages of the invention will be apparent from the following specification and the accompanying drawings, which are for the purpose of illustration only, and in which:

FIG. 4 is a vertical sectional view showing the impact machine with the impact tool lowered into engagement with a workpiece;

FIG. 5 is a view similar to FIG. 4 showing the actuation of the impact machine to strike a hammer blow on the workpiece;

FIG. 6 is an enlarged vertical sectional view of the sequence valve incorporated in the impact machine;

FIG. 7 is an enlarged vertical sectional view of another form of sequence valve; and FIG. 8 is a vertical sectional view taken on the broken line 8—8 of FIG. 7.

Figure 1:
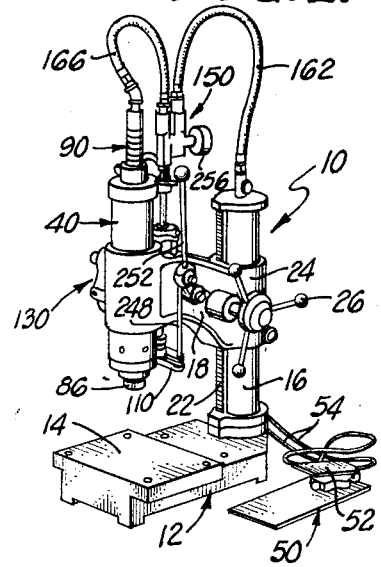
FIG. 1 is a perspective view showing an impact machine constructed in accordance with the teachings of the invention.

Referring ot the drawings, and particularly to FIGS. 1-3 and 4-5 thereof, I show an impact machine 10 constructed in accordance with the teachings of my invention including a support 12, said support being constituted by a work receiving bed 14, a post 16 and a supporting arm 18 adjustably secured thereto, in a manner to be described in greater detail below.

The post 16 incorporates a rack 22, which, as best shown in FIG. 1 of the drawings, is encompassed by a cylindrical portion 24 of the supporting arm 18. The supporting arm 18 incorporates an adjustment gear, not shown, which is rotatable by a hand wheel 26 and which is engaged upon the rack 22. Therefore, when the hand wheel 26 is rotated, concomitant rotation of the adjustment gear, not shown, is accomplished causing the supporting arm 18 to be correspondingly raised or lowered upon the post 16. The post 16 is hollow and serves as an accumulator for pressure fluid which it receives from a pressure fluid source, not shown.

Mounted in the outer extremity of the supporting arm 18 is a fluid drive actuating motor 30 which is juxtaposed to a fluid impact motor 40. The fluid drive motor 30 is located in a cylindrical bore 42 incorporated in the supporting arm 18 and includes a cylinder 44 in which is located a piston 46 having a piston rod 48 operatively connected thereto. It will be noted that the opposite extremities of the piston rod 48 project beyond the upper and lower extremities of the cylinder 44, for a purpose which will be described in greater detail below.

The fluid drive motor 30 is operatively connected to an actuating valve 50, which, in the present instance, is a foot treadle valve adapted to be energized by a foot treadle 52. The actuating valve 50 is connected by fluid pressure lines 54 to the fluid drive motor 30 whereby depression of the treadle 52 of said valve will cause simultaneous downward movement of the piston 46 and piston rod 48 thereof, as shown in FIG. 5 of the drawings. When the treadle 52 is released the piston 46 will be positively returned to the inoperative position shown in FIG. 2 of the drawings.

The impact motor 40 includes a cylinder 64 which is slidably mounted in a bore 62, said cylinder having a piston 66 movable therein. The piston 66 is engaged by a compression spring 68 whose upper extremity is located in an axial bore 72 in said piston and whose lower extremity is seated in an impact tool holder 76 located at the lower extremity of the cylinder 64. A guide rod 78 is encompassed by the compression spring 68 which serves to stabilize the compression spring 68 and guide the piston 66. The compression spring 68 also acts to return the piston 66 to the inoperative position thereof shown in FIG. 2 of the drawings.

The impact tool holder 76 includes a head 82 which is engaged upon a rubber cushion 84 at the lower extremity of the cylinder 64. The lower extremity of the impact tool holder 76 is constituted by an adjustable chuck 86 for the reception of an impact tool or hammer 88, as best shown in FIGS. 4 and 5 of the drawings.

Figure 2:
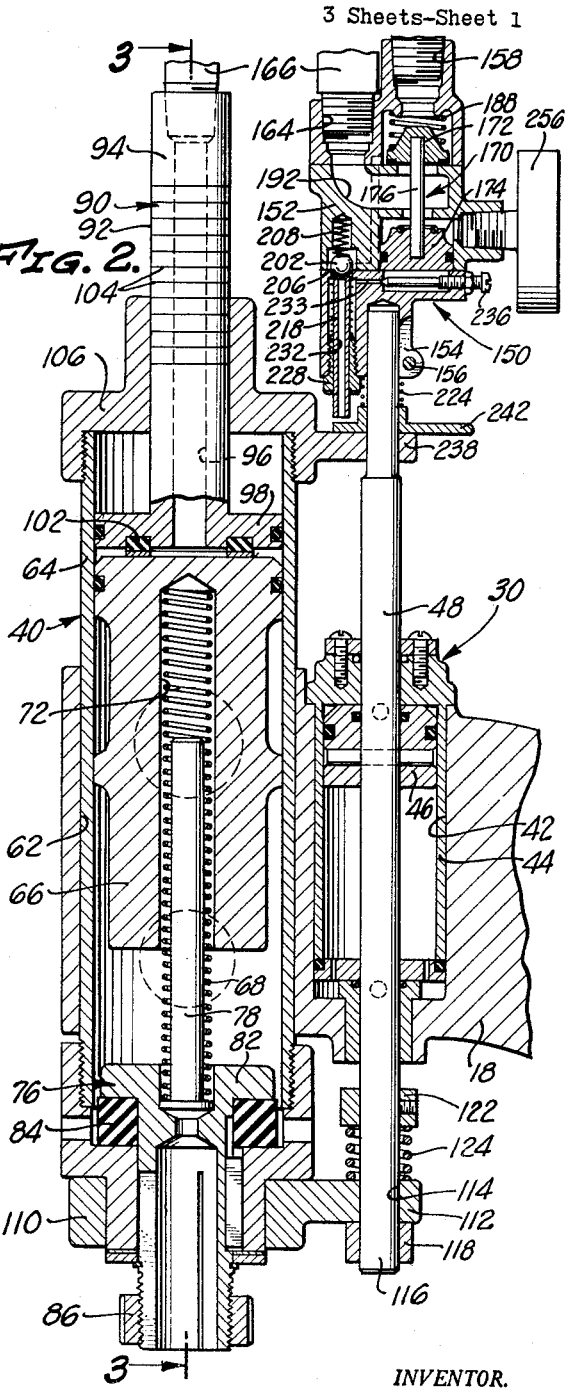
FIG. 2 is a vertical sectional view showing certain essential operative parts of the impact machine.

Mounted in the upper extremity of the cylinder 64 of the impact motor 40 is adjustment means 90 which is constituted by an adjustable element 92 which includes an elongated hollow shank 94 having an elongated bore 96 communicating with the interior of the cylinder 64 and a circular head 98 having cushion means 102 therein engageable by the upper extremity of the piston 66 when it is in the inoperative position shown in FIG. 2 of the drawings.

The elongated hollow shank 94 incorporates a plurality of annular adjustment indicia 104 and is encompassed by an adjustable clamp 106 may be released by a bolt 108 to permit free movement of the adjustable element 92 or tightening by turning said bolt to clamp said adjustable element in a predetermined position of adjustment within the cylinder 64.

Therefore, it is possible to adjust the inoperative position of the piston 66 within the cylinder 64 of the impact motor 40. In this manner the length of stroke of the piston 66 and, thus, the force of the hammer blow exerted upon the head 82 of the impact tool holder 76 may be controlled and a hammer blow or impact blow of predetermined force attained.

A yoke 110 is, as best shown in FIGS. 2–5 of the drawings, secured to the lower extremity of the cylinder 64, said yoke having a laterally projecting lug 112 incorporating an opening 114. The lower extremity 116 of the piston rod 48 of the actuating drive motor 30 protrudes through said opening and mounts a stop collar 118 engageable with the lug 112 to raise the cylinder 64 of the impact motor 40 upon upward movement of the piston rod 48.

A collar 122 is secured to the piston rod 48 above the lug 112 and a compression spring 124 is interposed between said collar and the upper surface of the lug 112. Therefore, movement of the piston rod 48 is communicated to the cylinder 64 of the impact motor 40 to lower or raise said motor. The spring 124 interposed between the collar 122 and the lug 112 constitutes a lost motion connection which, as will be described in greater detail below, permits relative movement between the piston rod 48 and the lug 112.

Also mounted on the supporting arm 18 is brake means 130, said brake means being constituted by an actuator 132 and a brake shoe 134. The actuator 132 includes a piston 136, which is movable by pressure fluid in a chamber 138 to actuate a lever 142 which urges a corresponding piston 144 against the brake shoe 134. The brake shoe 134 is driven against the exterior of the cylinder 64 of the impact motor 40 and this prevents said cylinder from moving in the associated bore 62 when the piston 66 strikes the impact tool holder 76.

A second, sequence control valve 150 is utilized to sequentially control the operation of the brake means 130 and the impact motor 40. The valve 150 includes a housing 152 which is mounted by means of an integral clamp 154 and a bolt 156 upon the upper extremity of the piston rod 48 of the fluid drive motor 30. The housing 152 of the valve 150, as best shown in FIGS. 2 and 6 of the drawings, includes an inlet port 158 connected by means of a flexible line 162 to the reservoir or accumulator of pressure fluid constituted by the post 16.

The valve 150 also includes an outlet port 164 which is connected by a flexible line 166 to the hollow shank 94 of the adjustable element 92 associated with the impact motor 40. Therefore, flow of pressure fluid from the inlet port 158 to the outlet port 164 through the line 166 to the interior of the impact motor cylinder 64 by means of the bore 96 in the hollow shank 94 of the adjustable element 92 will cause the piston 66 to be driven downwardly within said cylinder against the bias of the spring 68. In essence, the piston 66 acts as a hammer to strike the head 82 of the impact tool holder 76 which transmits the blow to the impact tool 88.

Interposed between the main inlet port 158 and the outlet port 164 is main valve means 170, said main valve means including opposed poppet valves 172 and 174 which are connected by means of a shaft 176 and which are adapted to seat, respectively, upon associated seats 182 and 184. The poppet valve 174 operates in a valve chamber 186 and is biased downwardly in said chamber by the action of a compression spring 188 engaged upon the poppet valve 172. Therefore, the poppet valve 172 is normally seated by the action of the compression spring 188 upon the associated seat 182 to prevent the flow of pressure fluid past the seat 182 and into a passage 192 which connects the main inlet port 158 with the outlet port 164. The respective positions of the poppet valves 172 and 174 when the valve 150 is inoperative are shown in FIG. 2 of the drawings.

A pilot valve means 200 controls the actuation of the main valve means 170, in a manner to be described in greater detail below, and includes a ball check 202 which is located in a chamber 204 and biased into engagement with an associated seat 206 by means of a compression spring 208. A by-pass passage 212 extends from the pressure side of the poppet valve 172 to the chamber 204 where the check valve 202 is located so that the chamber 204 is always at the same pressure as the chamber 214 in which the poppet valve 172 is located, for a purpose which will be described in greater detail below.

The ball check 202 is engageable by the upper extremity of a hollow actuating rod 218 to seal off the hollow interior thereof, said actuating rod being biased downwardly by means of a compression spring 222 engaged at its lower extremity upon an integral collar 224 on the perimeter of said rod. The elongated actuating rod 218 is located in an elongated bore 226 in the housing 152 and the collar 224 is adapted to engage the upper extremity of a gland nut 228 when the rod 218 is located in the inoperative position shown in FIG. 2 of the drawings.

When the elongated actuating rod 218 is located in the inoperative position of FIG. 2 of the drawings, the ball check 202 is seated upon the associated seat 206 which prevents the flow of presure fluid from the by-pass passage 212 into the elongated bore 226. Of course, the ball check 202 is not seated upon the upper extremity of the actuating rod 218 and, thus, permits flow of pressure fluid from the elongated bore 226, through the elongated passage 232 in the actuating rod 218, to the atmosphere.

A fluid passage 233 connects the elongated bore 226 with the chamber 186 in which the poppet valve 174 is located. A needle valve 236 is adjustable with respect to the extremity of the passage 233 to determine the flow rate of pressure fluid into the chamber 186 which, of course, determines the rapidity of movement of the poppet valve 174 whose lower extremity acts, of course, as a piston within the chamber 186 and serves, through the shaft 176 to raise the poppet valve 172 off the associated seat 182 against the bias of the compression spring 188.

It will be noted that the upper extremity of the piston rod 48 projects through a laterally extending arm 238 on the impact motor cylinder 64 and that the piston rod 48 is encompassed by an adjustable abutment 242 which can be rotated into or out of the path of movement of the lower extremity of the elongated actuating rod 218. A compression spring 244 interposed between the lower extremity of the valve housing 152 and the adjustable abutment 242 maintains said adjustable abutment in a predetermined position of adjustment.

Figure 3:
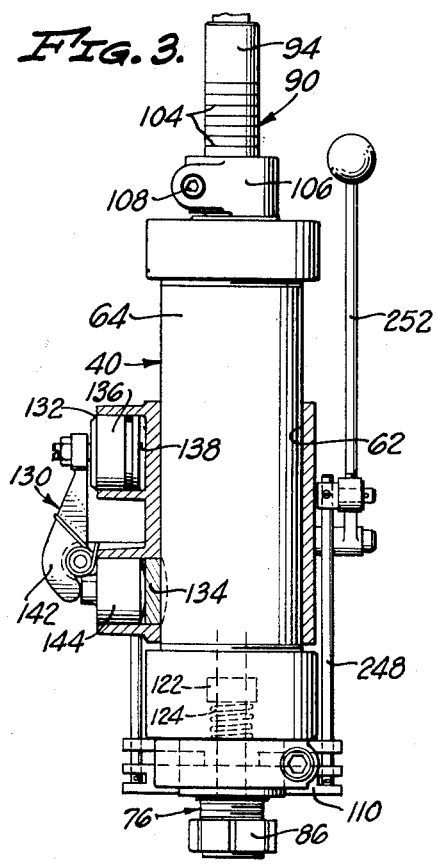
FIG. 3 is a vertical sectional view taken on the broken line 3—3 of FIG. 2.

It will be noted that, as best shown in FIGS. 1 and 3 of the drawings, a connecting rod 248 is interposed between the yoke 110 and a hand operated lever 252 which will permit the cylinder 64 of the impact motor 40 to be reciprocated in the bore 62. An exhaust muffler 256 is mounted on the valve housing 152.

The operation of the impact machine 10 is relatively simple. The initial steps involve the adjustment of the adjustable element 92 to determine the stroke of the piston 66 and, thus, determine the force exerted by said stroke upon the impact tool holder 76. Of course, a variety of types of tools such as coining devices, lettering heads, hammer heads, or the like may be mounted in the chuck 86 of the impact tool holder 76. After the adjustment of the piston 66 of the impact motor 40 has been accomplished and a proper tool 88 inserted in the chuck 86, a workpiece 262 can be placed on the work bed 14 of the support 12. Of course, the supporting arm 18 must be adjusted on the post 16 to determine the clearance of the tool 88 with the workpiece 262.

The treadle 52 of the actuating valve 50 can then be depressed. When this occurs, fluid under pressure is fed through the line 54 into the upper extremity of the cylinder 44 of the actuating drive motor 30 to urge the piston 46 and the associated rod 48 downwardly. Downward movement of the rod 48 is accompanied by concomitant downward movement of the cylinder 64 of the impact motor 40, thus bringing the tool 88 into engagement with the workpiece 262, as best shown in FIGS. 4 and 5 of the drawings, and halting further downward movement of the impact motor 40.

Downward movement of the piston rod 48 is accompanied by the downward movement of the housing 152 of the sequence valve 150. When the impact tool 88 engages the workpiece 262 further downward movement of the impact motor 40 is prevented. The lost motion connection constituted by the spring 124 interposed between the lug 112 and the collar 122 is actuated to permit relative movement between the housing 152 of the sequence valve 150 and the impact motor 40 which permits the housing 152 to move downwardly on the piston rod 48 and the elongated actuating rod 218 to engage the adjustable abutment 242 which is carried by the now immobile impact motor 40. When this occurs the elongated actuating rod 218 is deflected upwardly against the bias of the compression spring 208 to unseat the ball check 202 from the seat 206, and seat it upon the upper extremity of the rod 218, thereby preventing flow of pressure fluid through the rod 218 while permitting flow of pressure fluid through the by-pass passage 212 into the elongated bore 226, from whence it flows through the passage 233 into the chamber 186. It is obvious to those skilled in the art that the rate of flow or pressure fluid through the passage 233 from the elongated bore 226 is determined by the adjustment of the needle valve 236.

In any event, as the air under pressure flows into the chamber 186 it simultaneously flows through an associated line 266 which connects the elongated bore 226 with the chamber 138 for the brake actuating piston 136.

Therefore, the brake shoe 134 is urged into engagement with the perimeter of the elongated cylinder 64 of the impact motor 40 to prevent the impact motor cylinder 64 from reacting to the hammer blow of the impact motor. In other words, the brake shoe 134 dampens the movement of the cylinder 64 and prevents the dissipation of the hammer blow by a possible equal and opposite reaction to said blow.

As a matter of fact, the needle valve 236 controls the time interval between the engagement of the brake shoe 134 and the energization of the piston 66 of the impact motor 40. This is due to the fact that the amount of pressure fluid fed into the chamber 186 determines the rate of movement of the poppet valve 174 and, thus, the time at which the poppet valve 172 will be raised from operative relationship with the associated seat 182 to cause pressure fluid to flow through the valve housing 152 from the inlet port 158 to the outlet port 164 and, thus, through the elongated shank 94 of the adjustable element 92 and into the upper extremity of the cylinder 64 of the impact motor 40. When such pressure flow occurs, of course, the piston 66 is immediately energized and engages the head 82 of the impact tool holder 76 causing an operation to be performed upon the workpiece 262.

At the conclusion of the operation upon the workpiece 262 the treadle 52 of the valve 50 is released. This causes the flow of fluid through one of the lines 54 to the lower extremity of the cylinder 44 of the actuating drive motor 30. When this occurs, the piston rod 48 is retracted into the cylinder 44 by upward movement of the piston 46. Upward movement of the piston rod 48 initially occurs independently of the impact motor 40, because of the lost motion provided by the spacing between the collar 122 and the stop collar 118, which releases the lower extremity of the elongated actuating rod 218 from engagement with the adjustable abutment 242. Therefore, as will be described, the stop collar 118 engages the projection 112 to carry the impact motor 40 upwardly with the piston rod 48.

When the lower extremity of the elongated actuating rod 218 is released, the compression spring 208 biases the ball check 202 downwardly into engagement with the seat 206, and the spring 222 biases the rod 218 out of engagement with the ball check 202, thus preventing flow of pressure fluid through the by-pass passage 212 to the elongated bore 226 in which said actuating rod is located, but venting the brake chamber 138 through the bore 226, past the upper extremity of the rod 218, and out of the passage 232 to the atmosphere, and similarly venting the chamber 186 through the passage 232. Consequently, the unbraked impact motor 40 moves upwardly with the piston rod 48, and the compression spring 188 engaged upon the upper extremity of the poppet valve 172 urges said poppet valve downwardly into engagement with the seat 182 to cut the flow of pressure fluid from the inlet port 158 to the outlet port 164, also urging the poppet valve 174 out of engagement with its seat 184 to thereby vent pressure fluid from above the piston 66, and through the exhaust muffler 256 to the atmosphere. In this manner the spring 68 is caused to return the piston 66 to its original inoperative position in the supper extremity of the housing or cylinder 64 of the impact motor 40.

It will be noted that the rotatable and adjustable abutment 242 constitutes a safety feature because, when the rotatable abutment 242 is rotated into a position in which it cannot be engaged by the lower extremity of the elongated actuating rod 218, the actuation and energization of the valve 150 is prevented. Thus, it is not possible to energize the piston 66 of the impact motor 40 to deliver a blow. Moreover, the fact that the drive and actuating motor 30 lowers the tool 88 into engagement with the workpiece, and the fact that such engagement is necessary before the piston 66 can be actuated, prevents the interpositioning of the hands or fingers of an operator between the tool 88 and the workpiece 262 during actuation of the piston 66, thus preventing serious injury and eliminating the necessity for the utilization of various expensive and cumbersome safety devices. In addition, the facility with which the power of the stroke of the piston may be adjusted is an important aspect of the invention.

By the utilization of the sequence valve 150, the sequence of operation of the impact machine 10 is established, and the time dwell between the engagement of the brake upon the associated cylinder of the impact motor and the delivery of the hammer blow may be readily controlled by simple adjustment of the needle valve of the sequence valve 150.

Establishment of the time dwell between actuation of the brake and actuation of the impact cylinder is achieved in a different manner by another form of sequence valve 268, as illustrated in FIGS. 7 and 8. Since the sequence valve 268 is identical in most respects to the previously described sequence valve 150, the same numerals are used to indicate identical components.

The sequence valve 268 does not employ the principle of regulating the rate of flow of pressure fluid therethrough to establish the time dwell described, but instead employs two pilot valves 270 and 272, the pilot valve 270 controlling the flow of pressure fluid to the brake shoe 134, and the pilot valve 272 being subsequently actuable to control the flow of presure fluid to the impact motor 40.

The sequence valve 268 includes a housing 274 which incorporates the pair of pilot valves 270 and 272, each of which is identical to the pilot valve 150 previously described, including a ball check 202 which is located in a chamber 204 and biased into engagement with an associated seat 266 by means of a compression spring 208. However, the by-pass passage 212, in this embodiment, extends from the pressure side of the poppet valve 172 to both of the chambers 204 so that both of the chambers 204 of the pilot valves 270 and 272 are at the same pressure as the chamber 214 in which the poppet valve 172 is located.

A fluid passage 276 connects the elongated bore 226 of the pilot valve 272 with the lower extremity of the chamber 186 within which the poppet valve 174 moves, and it is noted that the passage 276 is unobstructed by any adjustable regulating means such as the needle valve 236 of the first-described sequence valve 150 of FIGS. 1–6.

The elongated bore 226 of the pilot valve 270 is not in communication with either the corresponding bore of the pilot valve 272 or with the chamber 186, but communicates with the brake means 130 through a passage 278 in the housing 274 of the sequence valve 268, and through the line 266 which is connected to the chamber 138 for the brake actuating piston 136.

The lower extremities of the elongated actuating rods 218 of the pilot valves 270 and 272 are engageable with an adjustable abutment 280 which encompasses the upper extremity of the piston rod 48 and rests upon the upper surface of the laterally extending arm 238 of the impact motor cylinder 64. The abutment 280, like the abutment 242 of the embodiment of FIGS. 1–6, is rotatable out of the path of the sequence valve for safety purposes, as previously described. However, unlike the abutment 242, the abutment 280 includes a stepped upper surface, the upper step 282 normally being engageable by the lower extremity of the pilot valve 270, and the lower step 284 normally being engageable by the lower extremity of the pilot valve 272.

With this arrangement, the pilot valve 270 is first engaged by the abutment 280 upon lowering of the piston rod 48 and the housing 274, and thereafter the pilot valve 272 is engaged by the abutment 280. The interval between the respective engagements is easily predetermined by the difference in height between the steps 282 and 284 so that the time delay between actuation of the brake means 130 and the impact motor 40 is also predetermined. Thus, the time delay is positively determined by the differential actuation of the pilot valves 270 and 272, and reliance upon regulation of air flow into the chamber 186 is not necessary.

It is important to note that employment of the two pilot valves 270 and 272 still requires, as was the case with the previously described single pilot valve 200, that the workpiece 262 be engaged by the tool 88 before actuation of the impact motor 40 occurs. This is necessarily so since such engagement is required to fix the position in space of the abutment 280 to provide a surface which the pilot valves 270 and 272 may engage to effect sequential actuation of the brake means 130 and the impact motor 40. Thus, a highly desirable safety feature is present which prevents the operator from placing his hand under the tool 88 and inadvertently actuating the impact motor 40. The impact motor 40 can only be actuated subsequently to and during engagement of the tool 88 with the workpiece 262.

I claim:

1. In an impact machine adapted to drive an impact tool against a workpiece, the combination of: a support; an impact motor mounted on said support for driving an impact tool against a workpiece; a positioning motor on said support having a drive element supporting said impact motor and downwardly movable for lowering said impact motor into proximity to said workpiece or raising said motor away from said workpiece; a first control valve operatively connected to said positioning motor for energizing said drive motor; a second control valve operatively connected to said impact motor for energizing the same, said second control valve being operatively connected to said drive element whereby downward movement of said drive element relative to said impact motor will cause the operation of said second control valve to actuate said impact motor; and a brake operatively connected to said second control valve an engageable with said impact motor upon operation of said second control valve whereby the return movement of said impact motor after an impact stroke has occurred may be dampened.

2. In an impact adapted to drive an impact tool against a workpiece, the combination of: a support a fluid drive motor mounted on said support; a first control valve connected to said fluid drive motor to cause the actuation of the same; an impact motor for carrying an impact tool mounted on said support in juxtaposition to said fluid drive motor, said impact motor being operatively connected to said fluid drive motor to permit said fluid drive motor to raise or lower said impact motor on said support; a second control valve connected to said impact motor to actuate said impact motor, said second control valve being operatively connected to said drive motor and including a valve actuator which is operated subsequently by engagement of said impact tool with a workpiece; and a brake connected to said second control valve and actuatable thereby prior to the energization of said impact motor, said brake being operatively connected to said impact motor to dampen return movement of said impact motor after an impact stroke has been made.

3. In an impact machine adapted to drive an impact tool against a workpiece, the combination of: a support, said support including a post and a supporting arm adjustably secured thereto; a drive motor mounted on said supporting arm, said drive motor including a cylinder, a piston in said cylinder, and a piston rod extending from said cylinder; an impact motor mounted on said supporting arm including a cylinder, and a piston mounted in said cylinder for actuating a tool holder, said cylinder being movable in said supporting arm and operatively connected to said piston rod of said drive motor whereby downward movement of said piston rod of said drive motor will cause concomitant downward movement of said impact motor cylinder; a second control valve for actuating said impact motor operatively connected to said drive motor piston rod whereby downward movement of said drive motor piston rod and said impact motor cylinder is accompanied by simultaneous movement of said second control valve, said second control valve being engageable with said impact motor upon downward movement of said drive motor piston rod relative to said impact motor to actuate said impact motor; and means interposed between said post and said supporting arm for adjusting said supporting arm with respect to said post.

4. In an impact machine adapted to drive an impact tool against a workpiece, the combination of: a support including a post and a supporting arm adjustably mounted upon said post, a fluid drive motor mounted on said supporting arm including a cylinder, a piston in said cylinder and a piston rod projecting from said cylinder; a fluid impact motor on said supporting arm including a cylinder mounted for movement on said supporting arm, and a piston operatively movable in said cylinder for engaging an impact tool holder, said impact motor cylinder being operatively connected to said drive motor piston rod whereby said drive motor is adapted to raise or lower said impact motor bodily on said supporting arm; a first control valve connected to said drive motor to lower or raise said drive motor piston rod and said impact motor cylinder; and a second control valve connected to said impact motor for driving said impact motor piston downwardly in said cylinder against said impact tool holder, said second control valve including an actuator adapted to be operated by downward movement of said fluid drive motor piston rod relative to said fluid impact motor, and valve means in said second control valve movable by operation of said actuator to feed pressure fluid to the cylinder of said impact motor.

5. In an impact machine adapted to drive an impact tool against a workpiece, the combination of: a support including a post and a supporting arm adjustably mounted upon said post; a fluid drive motor mounted on said supporting arm including a cylinder, a piston in said cylinder and a piston rod projecting from said cylinder; a fluid impact motor on said supporting arm including a cylinder mounted for movement on said supporting arm, a piston operatively movable in said cylinder and an impact tool holder engageable with said piston, said impact motor cylinder being operatively connected to said drive motor piston rod whereby said drive motor is adapted to raise or lower said impact motor bodily on said supporting arm; a first control valve connected to said drive motor to lower or raise said drive motor piston rod and said impact motor cylinder; a second control valve connected to said impact motor for driving said impact motor piston downwardly in said cylinder against said impact tool holder, said second control valve including an actuator adapted to be operated by downward movement of said fluid drive motor piston rod relative to said fluid impact motor, and pilot and main valve means in said second control valve movable by operation of said actuator to feed pressure fluid to the cylinder of said impact motor, said valve incorporating a by-pass; and a brake operatively connected to said impact motor and energizable by pressure fluid from said by-pass upon energization of said pilot valve means by said actuator to prevent free movement of said piston of said impact motor after an impact stroke.

6. In an impact machine adapted to be utilized in driving an impact tool against a workpiece, the combination of: a support; a fluid drive motor operatively connected to said support and including a cylinder, a piston in said cylinder and a piston rod extending from the opposite extremities of said cylinder; an impact motor operatively connected to said support, said impact motor including a cylinder movable with respect to said support, a piston in said cylinder and an impact tool holder operable by said piston, said impact motor cylinder being operatively connected to one extremity of said drive motor piston rod whereby concomitant movement of said drive motor piston rod and said impact motor cylinder is attained to raise or lower said impact motor, and whereby said drive motor piston rod is movable downwardly independently of said impact motor upon restraint of said impact motor by engagement of the impact tool thereof against a workpiece; a first control valve operatively connected to said drive motor to feed pressure fluid to said drive motor cylinder to lower or raise said piston rod; and a second control valve operatively connected to said impact motor whereby said impact motor piston may be driven downwardly to operate said impact tool holder, said second control valve being operatively connected to and movable with the other extremity of said drive motor piston rod and including an actuator operable upon independent downward movement of said drive motor piston rod relative to said impact motor, said second control valve including a pilot valve operatively connected to said actuator and main valve means operable by said pilot valve, whereby release of said pilot valve by said actuator will cause the operation of said main valve means to feed fluid under pressure to said impact motor cylinder to cause said impact motor piston to operate said impact tool holder.

7. In an impact machine adapted to be utilized in driving an impact tool against a workpiece, the combination of: a support, a fluid drive motor operatively connected to said support and including a cylinder, a piston in said cylinder and a piston rod extending from the opposite extremities of said cylinder; an impact motor operatively connected to said support, said impact motor including a cylinder movable with respect to said support, a piston in said cylinder and an impact tool holder operable by said piston, said impact motor cylinder being operatively connected to one extremity of said drive motor piston rod whereby concomitant movement of said drive motor piston rod and said impact motor cylinder is attained to raise or lower said impact motor, and whereby said drive motor piston rod is movable downwardly independently of said impact motor by engagement of the impact tool thereof against a workpiece; a first control valve operatively connected to said drive motor to feed pressure fluid to said drive motor cylinder to lower or raise said piston rod; a second control valve operatively connected to said impact motor whereby said impact motor piston may be driven downwardly to operate said impact tool holder, said second control valve being operatively connected to and movable with the other extremity of said drive motor piston rod and including an actuator operable upon independent downward movement of said drive motor piston rod relative to said impact motor, said second control valve including a pilot valve operatively connected to said actuator and main valve means operable by said pilot valve, whereby release of said pilot valve by said actuator will cause the operation of said main valve means to feed fluid under pressure to said impact motor cylinder to cause said impact motor piston to operate said impact tool holder, said second control valve including a by-pass connected between the high pressure sides of said main valve means and said pilot valve; and a brake operatively connected to said impact motor for dampening movement of said impact motor, said brake being operatively connected to said second control valve and being adapted to be energized by a flow of pressure fluid through said by-pass upon the release of said pilot valve by said actuator.

8. In an impact machine adapted to drive an impact tool against a workpiece, the combination of: a support; impact means including an impact cylinder carried by said support for movement toward and away from a workpiece; an impact tool holder supported within said housing for carrying an impact tool, and an impact piston movable within said impact cylinder and operable to strike said impact tool holder to drive said impact tool forcibly against said workpiece; drive means connected to said impact means and operative to move said impact means to bring said impact tool into engagement with said workpiece; a brake carried by said support and operable to engage and constrain said impact cylinder against movement relative to said support; and valve means carried by said support and connected to said drive means for movement toward and away from said workpiece, said valve means being connected to said brake and to said cylinder and actuable to operate said brake and said impact piston, said valve means including a first actuator and a second actuator serially engageable with said impact means, upon engagement of said impact tool with said workpiece and consequent relative movement between said impact means and said valve means, said first actuator being operative upon engagement with said impact means to actuate said valve means to operate said brake, said second actuator being operative upon engagement with said impact means subsequent to said first actuator to actuate said valve means to operate said impact piston.

9. In an impact machine adapted to drive an impact tool against a workpiece, the combination of: a support; impact means including an impact cylinder carried by said support for movement toward and away from a workpiece; an impact tool holder supported within said housing for carrying an impact tool, and an impact piston movable within said impact cylinder and operable to strike said impact tool holder to drive said impact tool forcibly against said workpiece; a brake carried by said support and operable to engage and constrain said impact cylinder against movement relative to said support; valve means carried by said support for movement toward and away from said workpiece, said valve means being connected to said brake and to said cylinder and actuable to operate said brake and said impact piston, said valve means including a first actuator and a second actuator serially engageable with said impact means upon engagement of said impact tool with said workpiece and continued movement of said valve means toward said workpiece, said first actuator being operative upon engagement with said impact means to actuate said valve means to operate said brake, said second actuator being operative upon engagement with said impact means subsequent to said first actuator to actuate said valve means to operate said impact piston; and means to effect movement of said impact means and said valve means toward said workpiece, and for moving said valve means toward said workpiece independently of said impact means upon engagement of said impact tool with said workpiece, whereby said engagement of said impact tool with said workpiece must occur prior to actuation of said valve means.

References Cited in the file of this patent
UNITED STATES PATENTS

| | | |
|---|---|---|
| 1,003,154 | Scott | Sept. 12, 1911 |
| 1,723,730 | Haight | Aug. 6, 1929 |
| 2,121,817 | Nast | June 28, 1938 |
| 2,130,982 | Gartin | Sept. 20, 1938 |
| 2,199,337 | Gartin | Apr. 30, 1940 |
| 2,400,330 | Allen | May 14, 1946 |
| 2,944,521 | Kibbe | July 12, 1960 |